US009456391B2

(12) United States Patent
Takahashi et al.

(10) Patent No.: US 9,456,391 B2
(45) Date of Patent: Sep. 27, 2016

(54) RADIO BASE STATION

(71) Applicant: NTT DOCOMO, INC., Tokyo (JP)

(72) Inventors: Hideaki Takahashi, Tokyo (JP); Kenichiro Aoyagi, Tokyo (JP); Wuri Andarmawanti Hapsari, Tokyo (JP); Takayuki Watanabe, Tokyo (JP); Tatsuro Yajima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/431,200

(22) PCT Filed: Sep. 20, 2013

(86) PCT No.: PCT/JP2013/075530
§ 371 (c)(1),
(2) Date: Mar. 25, 2015

(87) PCT Pub. No.: WO2014/050753
PCT Pub. Date: Apr. 3, 2014

(65) Prior Publication Data
US 2015/0245257 A1    Aug. 27, 2015

(30) Foreign Application Priority Data

Sep. 26, 2012 (JP) .................................. 2012-212958

(51) Int. Cl.
*H04W 36/08* (2009.01)
*H04W 36/00* (2009.01)
(Continued)

(52) U.S. Cl.
CPC ......... *H04W 36/0061* (2013.01); *H04W 36/08* (2013.01); *H04W 76/02* (2013.01); *H04W 76/04* (2013.01); *H04W 36/02* (2013.01); *H04W 88/08* (2013.01); *H04W 92/20* (2013.01)

(58) Field of Classification Search
CPC ........... H04W 36/0061; H04W 36/02; H04W 36/08; H04W 76/02; H04W 76/04; H04W 88/08; H04W 92/20
USPC ....... 455/561, 441, 436, 440, 442, 522, 507, 455/456.1, 418, 435.2, 438, 525; 370/331, 370/329, 328, 338, 252, 336
See application file for complete search history.

(56) References Cited

U.S. PATENT DOCUMENTS 8,548,477 B2 * 10/2013 Hapsari ................... H04W 4/20
370/331
2009/0124259 A1 * 5/2009 Attar ....................... H04L 47/10
455/436

(Continued)

FOREIGN PATENT DOCUMENTS

JP    2012-126138 A    7/2012
WO    2011/068213 A1   6/2011

OTHER PUBLICATIONS

International Search Report issued in PCT/JP2013/075530 mailed on Nov. 19, 2013 (3 pages).

(Continued)

Primary Examiner — Tan H Trinh
(74) Attorney, Agent, or Firm — Osha Liang LLP

(57) ABSTRACT

A signal load onto a mobility management node MME is reduced by defining a case which does not require "Path Switch" when X2 handover processing is performed for a mobile station UE. A radio base station eNB#1 according to the present invention includes a handover processing unit 14 configured not to perform "Path Switch" when performing X2 handover processing for a mobile station to a radio base station eNB#2 having the same "Virtual eNB ID#1" as the radio base station eNB#1.

3 Claims, 7 Drawing Sheets

(51) Int. Cl.
*H04W 76/04* (2009.01)
*H04W 76/02* (2009.01)
*H04W 36/02* (2009.01)
*H04W 92/20* (2009.01)
*H04W 88/08* (2009.01)

(56) References Cited

U.S. PATENT DOCUMENTS

| | | | | |
|---|---|---|---|---|
| 2010/0195635 | A1* | 8/2010 | Maeda | H04W 8/26 370/338 |
| 2011/0007709 | A1* | 1/2011 | Akiyoshi | H04W 36/0066 370/331 |
| 2011/0013588 | A1* | 1/2011 | Jeon | H04W 36/0055 370/331 |
| 2011/0013593 | A1* | 1/2011 | Hapsari | H04W 36/02 370/331 |
| 2011/0269465 | A1* | 11/2011 | Xu | H04W 36/0033 455/436 |
| 2012/0044876 | A1* | 2/2012 | Taaghol | H04W 84/042 370/329 |
| 2012/0157102 | A1* | 6/2012 | Yang | H04W 36/0016 455/436 |
| 2012/0177007 | A1* | 7/2012 | Kagimoto | H04W 4/20 370/331 |
| 2012/0182969 | A1* | 7/2012 | Takahashi | H04W 24/10 370/331 |
| 2012/0188984 | A1* | 7/2012 | Takahashi | H04W 36/0083 370/331 |
| 2012/0257602 | A1* | 10/2012 | Takahashi | H04W 36/0061 370/336 |
| 2012/0258719 | A1* | 10/2012 | Fujito | H04W 88/08 455/438 |
| 2012/0258768 | A1* | 10/2012 | Takahashi | H04W 36/0083 455/525 |
| 2013/0029707 | A1* | 1/2013 | Virta | H04B 17/309 455/507 |
| 2013/0072193 | A1* | 3/2013 | Anantha | H04W 36/0055 455/436 |
| 2013/0294403 | A1* | 11/2013 | Srinivasan | H04W 36/165 370/331 |
| 2013/0294405 | A1* | 11/2013 | Radulescu | H04W 36/34 370/331 |
| 2014/0148174 | A1* | 5/2014 | Teyeb | H04W 36/0083 455/441 |
| 2014/0153504 | A1* | 6/2014 | Wang | H04W 28/14 370/329 |
| 2015/0016371 | A1* | 1/2015 | Lee | H04J 11/0053 370/329 |

OTHER PUBLICATIONS

Written Opinion of the International Searching Authority issued in PCT/JP2013/075530 mailed on Nov. 19, 2013 (3 pages).
Catt et al.; "Discussion on necessity of Path Switch procedure"; 3GPP TSG RAN WG3 Meeting AH, R3-101882; Beijing, P.R. China; Jun. 29-Jul. 1, 2010 (3 pages).
Alcatel-Lucent Shanghai Bell et al.; "Further consideration of intra-DeNB handover for RN"; 3GPP TSG-RAN WG3 Meeting #69bis, R3-102921; Oct. 11-15, 2010 (2 pages).
Huawei; "Discussion of the Path Switch Procedure in Intra-DeNB HO"; 3GPP TSG RAN WG3 #69 meeting, R3-102043; Madrid, Spain; Aug. 23-27, 2010 (2 pages).
Potevio; "Further Consideration about X2 HO Request towards the RN"; 3GPP TSG-RAN WG3 #71, R3-110677; Taipei; Feb. 21-25, 2011 (5 pages).
3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).
3GPP TS 36.413 V11.0.0; "3rd Generation Partnership Project; Technical Specification Group Radio Access Network; Evolved Universal Terrestrial Radio Access Network (E-UTRAN); S1 Application Protocol (S1AP) (Release 11)"; Jun. 2012 (258 pages).
3GPP TS 36.423 V11.2.0; "3rd Generation Partnership Project; Technical Specification Group Radio Access Network; Evolved Universal Terrestrial Radio Access Network (E-UTRAN); X2 Application protocol (X1AP) (Release 11)"; Sep. 2012 (136 pages).
Extended European Search Report in counterpart European Application No. 13 84 2824.8 issued Apr. 13, 2013 (7 pages).
S. Kwon et al; "Virtual Extension of Cell IDs in a Femtocell Environment"; 2011 IEEE Wireless Communications and Networking Conference, XP031876291, pp. 428-433; Mar. 28, 2011 (6 pages).

* cited by examiner

FIG. 3

| No. | Target PCI | Target ECGI | No Remove | No HO | No X2 | Virtual eNB ID |
|---|---|---|---|---|---|---|
| 1 | 2 | 11010001 | | | | 1 |
| 2 | 3 | 11010002 | | | | 1 |
| 3 | 4 | 87654321 | | | | 2 |
| 4 | ... | ... | | | | ... |

FIG. 4

X2 setup request

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 .. <maxCellineNB> | | Complete list of cells served by the eNB | YES | reject |
| >Served Cell Information | M | | 9.2.8 | | – | – |
| >Neighbour Information | | 0 .. <maxnoofNeighbours> | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |
| GU Group Id List | | 0 .. <maxfPools> | | This is all the pools to which the eNB belongs to | GLOBAL | reject |
| >GU Group Id | M | | 9.2.20 | | – | – |
| Virtual eNB ID | M | | 9.2.XX | | YES | reject |

FIG. 5

X2 setup response

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 .. <maxCellineNB> | | Complete list of cells served by the eNB | YES | reject |
| >Served Cell Information | M | | 9.2.8 | | - | - |
| >Neighbour Information | | 0 .. <maxnoofNeighbours> | | | - | - |
| >>ECGI | M | | ECGI 9.2.14 | E-UTRAN Cell Global Identifier of the neighbour cell | | - |
| >>PCI | M | | INTEGER (0..503, ...) | Physical Cell Identifier of the neighbour cell | - | |
| >>EARFCN | M | | 9.2.26 | DL EARFCN for FDD and EARFCN for TDD | - | |
| GU Group Id List | | 0 .. <maxPools> | | This is all the pools to which the eNB belongs to | GLOBAL | reject |
| >GU Group Id | M | | 9.2.20 | | - | - |
| Criticality Diagnostics | O | | 9.2.7 | | YES | ignore |
| Virtual eNB ID | M | | 9.2.XX | | YES | reject |

FIG. 6

| IE/Group Name | Presence | Range | IE type and reference | Semantics description | Criticality | Assigned Criticality |
|---|---|---|---|---|---|---|
| Virtual eNB ID | M | | BIT STRING (XX) | Identifies eNB groups in which S1 path switch procedure is not required after X2 handover | – | – |

RADIO BASE STATION

TECHNICAL FIELD

The present invention relates to a radio base station.

BACKGROUND ART

LTE (Long Term Evolution) is configured such that "Path Switch" is performed between a radio base station eNB and a mobility management node MME (Mobility Management Entity) when X2 handover processing is performed for a mobile station UE.

PRIOR ART DOCUMENT

Patent Document

Patent document 1: Japanese Patent Application No. 2012-126138

Non-Patent Documents

Non-patent document 1: 3GPP TS36.300
Non-patent document 2: 3GPP TS36.413
Non-patent document 3: 3GPP TS36.423

SUMMARY OF THE INVENTION

In an operation possibly employable for reducing a signal load onto a mobility management node MME (core network), when X2 handover processing is performed, the above-described "Path Switch" is skipped and user data is transferred between radio base stations eNB byway of the radio base station eNB serving previously before handover processing.

However, there is a problem that existing LTE does not define which radio base stations eNB the aforementioned transfer processing of user data is to be applied to make "Path Switch" unnecessary, when X2 handover processing for the mobile station UE is performed from a cell under a radio base station eNB to a cell under another radio base station eNB.

Accordingly, the present invention is made with a view to the above-described problem, and an objective of the present invention is to provide a radio base station which is capable of reducing a signal load on a mobility management node by defining a case which does not require "Path Switch" when X2 handover processing is performed for a mobile station.

A first feature of the present invention is summarized a radio base station, including: a handover processing unit configured not to perform a path switch when performing X2 handover processing for a mobile station to another radio base station having the same virtual radio base station identification information as the radio base station.

BRIEF DESCRIPTION OF THE DRAWINGS

FIG. 3 is a diagram illustrating one example of an NRT which is managed by a management unit of the radio base station according to the first embodiment of the present invention.

FIG. 4 is a diagram illustrating one example of a format of "X2 setup request" which is used in the mobile communication system according to the first embodiment of the present invention.

FIG. 5 is a diagram illustrating one example of a format of "X2 setup response" which is used in the mobile communication system according to the first embodiment of the present invention.

FIG. 6 is a diagram illustrating one example of a format of an information element "Virtual eNB ID" included in the "X2 setup request" and the "X2 setup response" which are used in the mobile communication system according to the first embodiment of the present invention.

DETAILED DESCRIPTION (Mobile Communication System According to the First Embodiment of the Present Invention)

A mobile communication system according to a first embodiment of the present invention will be described with reference to FIGS. 1 to 7.

Figure 1:
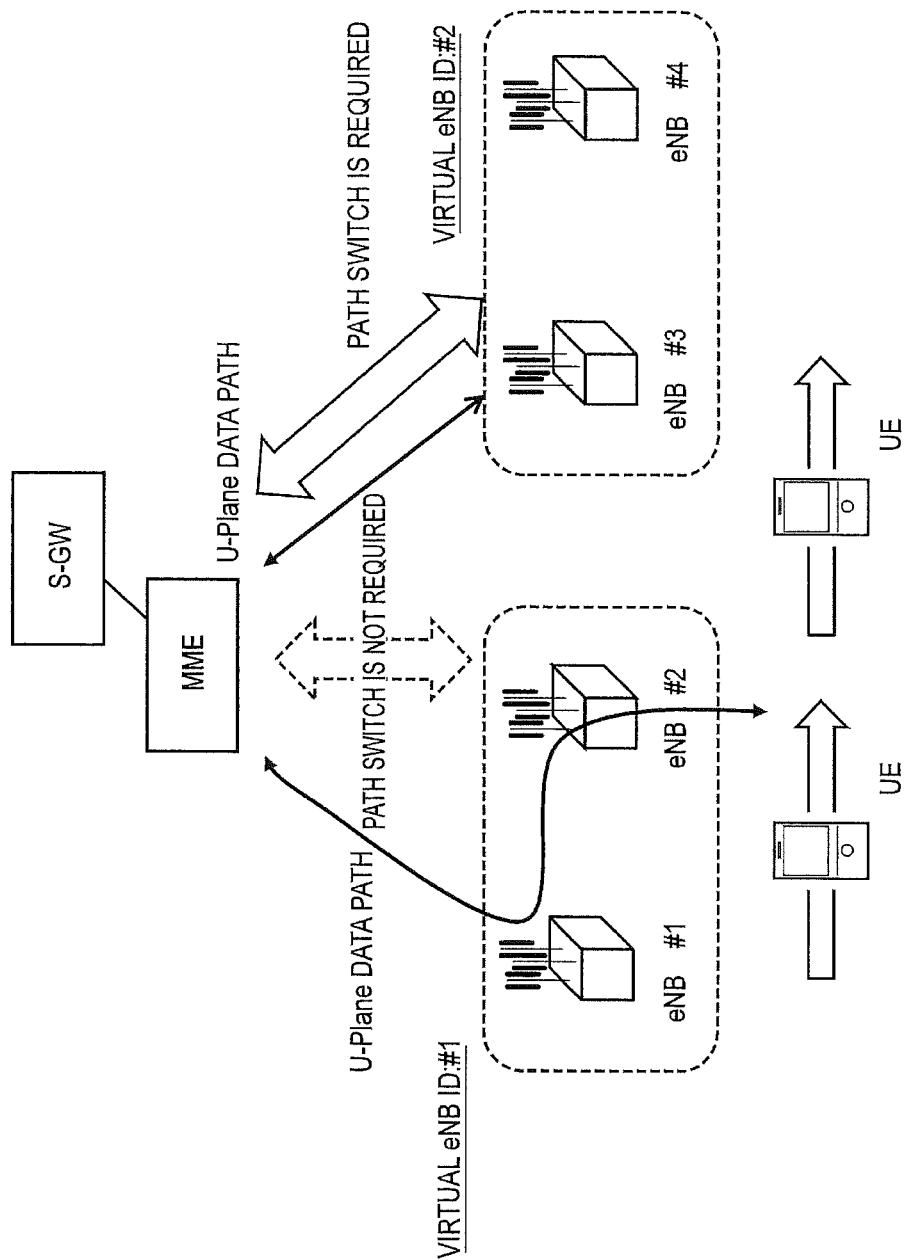
FIG. 1 is an entire configuration diagram of a mobile communication system according to a first embodiment of the present invention.

As illustrated in FIG. 1, the mobile communication system according to the present embodiment is an LTE mobile communication system, which includes a gateway apparatus S-GW (Serving-Gateway), a mobility management node MME, and radio base stations eNB#1 to eNB#4.

Here, the radio base stations eNB#1/eNB#2 have "Virtual eNB ID#1" and the radio base stations eNB#3/eNB#4 have "Virtual eNB ID#2."

In other words, the radio base stations eNB#1/eNB#2 belong to a same group and the radio base stations eNB#3/eNB#4 belong to a same group.

In addition, X2 handover between cells under radio base stations eNB having a same "Virtual eNB ID," that is, X2 handover processing between cells under radio base stations eNB belonging to the same group can omit "Path Switch."

In an example of FIG. 1, the system is configured such that "Path Switch" is not performed when the mobile station UE performs the X2 handover processing between a cell #1 under the radio base station eNB#1 and a cell #2 under the radio base station eNB#2.

Similarly, the system is configured such that "Path Switch" is not performed when the mobile station UE performs the X2 handover processing between a cell #3 under the radio base station eNB#3 and a cell #4 under the radio base station eNB#4.

On the other hand, the system is configured such that "Path Switch" is performed when the mobile station UE performs the X2 handover processing between the cells #1/#2 under the radio base stations eNB#1/eNB#2 and the cells #3/#4 under the radio base stations eNB#3/eNB#4.

Figure 2:
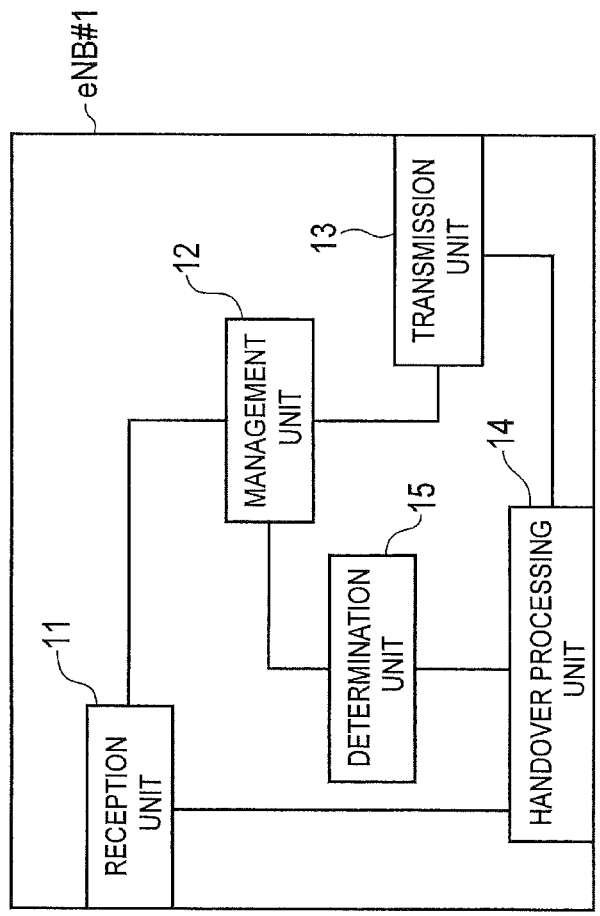
FIG. 2 is a functional block diagram of a radio base station according to the first embodiment of the present invention.

The configurations of the radio base stations eNB#1 and eNB#2 are basically the same with each other, and the description is given below to the configuration of the radio base station eNB#1 as an example. As illustrated in FIG. 2, the radio base station eNB#1 includes a reception unit 11, a management unit 12, a transmission unit 13, a handover processing unit 14, and a determination unit 15.

The reception unit 11 is configured to receive various kinds of signals from the mobile station UE, the neighbor radio base stations eNB#2 to #4, the mobility management node MME, the gateway apparatus S-GW, and the like.

The management unit 12 is configured to manage "NRT (Neighbor Relation Table)" including information on the neighbor radio base stations eNB#2 to #4 of the radio base station eNB#1.

For example, as illustrated in FIG. 3, the NRT includes, as the information on the neighbor radio base stations eNB, "Target PCI (Physical Cell Identifier), "Target ECGI (E-UTRAN Cell Global Identifier)", "No Remove," "No HO," "No X2," and "Virtual eNB ID."

The "Target PCI" indicates PCI of a cell under a corresponding neighbor radio base station eNB, and the "Target ECGI" indicates ECGI of a cell under a corresponding neighbor radio base station eNB.

The "No Remove" is a flag indicating whether or not an entry about the corresponding neighbor radio base station eNB can be removed from the NRT. When the "No Remove" is checked, it indicates that the radio base station eNB#1 cannot remove the entry about the corresponding neighbor radio base station eNB from the NRT.

The "No HO" is a flag indicating whether or not an entry about the corresponding neighbor radio base station eNB can be obtained in the handover processing. When the "No HO" is checked, it indicates that the radio base station eNB#1 cannot use the entry about the corresponding neighbor radio base station eNB in the handover processing.

The "No X2" is a flag indicating whether or not X2 interface can be used for starting procedures on the corresponding neighbor radio base station eNB. When the "No X2" is checked, it indicates that the radio base station eNB#1 cannot use the X2 interface for starting procedures on the corresponding neighbor radio base station eNB.

The "Virtual eNB ID" indicates "Virtual eNB ID" of the corresponding neighbor radio base station eNB.

The reception unit 11 may acquire the "Virtual eNB ID (see FIG. 6)" included in the "X2 setup request (see FIG. 4)" or "X2 setup response (see FIG. 5) " which is received from each of the neighbor radio base stations eNB of the radio base station eNB#1 and accumulate it in the management unit 12.

The transmission unit 13 is configured to transmit various kinds of signals to the mobile station UE, the neighbor radio base stations eNB#2 to #4, the mobility management node MME, the gateway apparatus S-GW, and the like.

For example, the transmission unit 13 transmits "X2 setup request" or "X2 setup response" including "Virtual eNB ID#1" of the radio base station eNB#1 to the neighbor radio base stations eNB#2 to #4 of the radio base station eNB#1.

The handover processing unit 14 is configured to perform handover processing (X2 handover processing, S1 handover processing, or the like) on the mobile station UE.

For example, the handover processing unit 14 does not perform "Path Switch" when the X2 handover processing to the radio base station eNB#2 having the same "Virtual eNB ID#1" as the radio base station eNB#1 is performed on the mobile station UE.

The determination unit 15 is configured to determine whether or not the neighbor radio base stations eNB'2 to #4 have the same "Virtual eNB ID#1" as the radio base station eNB#1 with reference to the NRT managed by the management unit 12.

Here, the handover processing unit 14 is configured to determine, based on the determination result made by the determination unit 15, whether or not "Path Switch" is performed when the above-described X2 handover processing is performed.

An operation of the mobile communication system according to the present embodiment will be described below with reference to FIG. 7.

Figure 7:
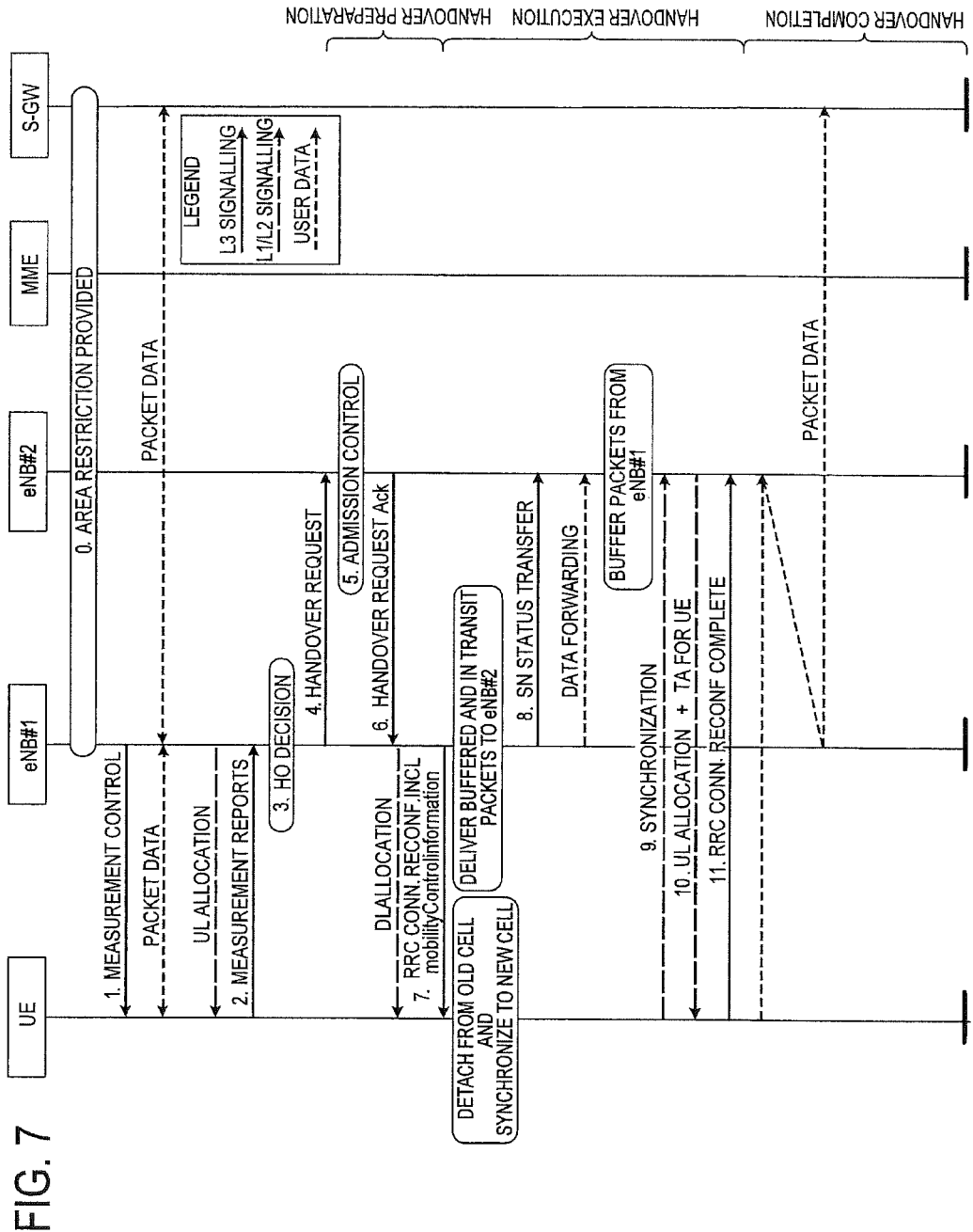
FIG. 7 is a sequence diagram illustrating an operation of the mobile communication system according to the first embodiment of the present invention.

As illustrated in FIG. 7, at step 1, the radio base station eNB#1 transmits "Measurement Control" to the mobile station UE when the mobile station UE is in an "RRC Connected state" in the cell #1 under the radio base station eNB#1.

In such a state, the uplink user data (packet data) is transmitted from the mobile station UE to the gateway apparatus S-GW through the radio base station eNB#1, and the downlink user data (packet data) is transmitted from the gateway apparatus S-GW to the mobile station UE through the radio base station eNB#1.

At step 2, the mobile station UE transmits "Measurement Report" to the radio base station eNB#1 by using a radio resource (PUSCH: Physical Uplink Shared Channel) which is allocated by the "UL allocation" in response to the "Measurement Control".

At step 3, the radio base station eNB#1 determines to perform. the X2 handover processing on the mobile station UE to the cell under the radio base station eNB#2 based on the "Measurement Report."

Here, the radio base station eNB#1 determines that the radio base station eNB#2 has the same "Virtual eNB ID#1" as the radio base station eNB#1 by referring to the management unit 12.

At step 4, the radio base station eNB#1 transmits "Handover Request" requesting that the X2 handover processing is performed to the radio base station eNB#2.

The radio base station eNB#2 performs "Admission Control" at step 5 in response to the "Handover Request", and transmits "Handover Request Ack" to the radio base station eNB#1 at step 6.

The radio base station eNB#1 transmits "RRC Connection Reconfiguration" including "mobilityControlinformaiton" to the mobile station UE by using the radio resource which is notified by the "DL allocation."

The mobile station UE switches a cell to acquire the downlink user data from the cell #1 to the cell #2 in response to the "mobilityControlinfomtion."

In addition, at step 8, the radio base station eNB#1 transmits "SN Status Transfer" and transfers the buffering downlink user data to the radio base station eNB#2.

Here, since the radio base station eNB#1 does not perform "Path Switch", the downlink user data is transmitted hereinafter from the gateway apparatus S-GW to the mobile station UE in the following path of the gateway apparatus S-GW, the radio base station eNB#1, the radio base station eNB#2, and the mobile station UE in this order.

At step 9, the mobile station UE transmits "Synchronistation" to the radio base station eNB#2. At step 10, the radio base station eNB#2 transmits "UL allocation" and "TA (Timing Advance) command" for the mobile station UE to the mobile station UE. Then, at step 11, the mobile station UE transmits "RRC Connection Reconfiguration" to the radio base station eNB#2.

Thereafter, the uplink user data is transmitted from the mobile station UE to the gateway apparatus S-GW in the following path of the mobile station UE, the radio base station eNB#2, the radio base station eNB#1, and the gateway apparatus S-GW in this order.

The features of the present embodiment may also be expressed as follows.

A first feature of the present embodiment is summarized as a radio base station eNB#1, including: a handover processing unit 14 configured not to perform "Path Switch"

when performing X2 handover processing for mobile station UE to a radio base station eNB#2 having the same "Virtual eNB ID (virtual radio base station identification information) #1" as the radio base station eNB#1.

With the above-described configuration, "Path Switch" is not performed when the handover processing on the mobile station UE between the cells under the radio base stations eNB having the same "Virtual eNB ID" is performed, so that a signal load onto the mobility management node MME can be reduced.

In the first feature of the present embodiment, the radio base station eNB#1 may include a determination unit 15; and a management unit 12 configured to manage "NRT (neighbor relation table)" including information on neighbor radio base stations eNB#2 to #4 of the radio base station eNB#1. Here, the "NRT" may include "Virtual eNB IDs" of the neighbor radio base stations eNB#2 to #4 as information on the neighbor radio base station eNB, and the determination unit 15 may determine whether or not each of the neighbor radio base stations eNB#2 to #4 has the same "Virtual eNB ID#1" as the radio base station eNB#1 by referring to the "NRT."

With the above-described configuration, the "Virtual eNB ID" is added as a management item in the existing NRT, so that it can be determined without making a major reconfiguration whether or not each of the neighbor radio base stations eNB#2 to #4 has the same "Virtual eNB ID#1" as the radio base station eNB#1.

In the first feature of the present embodiment, the radio base station eNB#1 may include a reception unit 11 configured to acquire "Virtual eNB ID" included in "X2 setup request (connection setup request signal)" or "X2 setup response (connection setup response signal)" which is received from each of the neighbor radio base stations eNB#2 to #4 of the radio base station eNB#1 and accumulate it in the management unit 12.

With the above-described configuration, the "Virtual eNB ID" of each of the neighbor radio base stations eNB#2 to #4 can be acquired by using the existing "X2 setup request" or "X2 setup response."

In the first feature of the present embodiment, the radio base station eNB#1 may include a transmission unit 13 configured to transmit "X2 setup request" or "X2 setup response" which includes "Virtual eNB ID#1" of the radio base station eNB#1 to the neighbor radio base stations eNB#2 to #4 of the radio base station eNB#1.

With the above-described configuration, it is possible to notify the neighbor radio base stations eNB#2 to #4 of the "Virtual eNB ID" of the radio base station eNB#1 by using the existing "X2 setup request" or "X2 setup response."

It should be noted that the foregoing operations of the mobile station UE, the radio base station eNB, the mobility management node MME, and the gateway apparatus S-GW may be implemented by hardware, maybe implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE, the radio base station eNB, the mobility management node MME, and the gateway apparatus S-GW. Otherwise, the storage medium and the processor may be provided as discrete components inside the mobile station UE, the radio base station eNB, the mobility management node MME, and the gateway apparatus S-GW.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-212958 (filed on Sep. 26, 2012) is incorporated by reference in the present specification.

INDUSTRIAL APPLICABILITY

As described above, the present invention can provide a radio base station which is capable of reducing a signal load onto a mobility management node by defining a case which does not require "Path switch" when X2 handover processing is performed for a mobile station.

EXPLANATION OF REFERENCE NUMERALS

S-GW gateway apparatus
MME mobility management node
eNB#1 to eNB#4 radio base station
UE mobile station
11 reception unit
12 management unit
13 transmission unit
14 handover processing unit
15 determination unit

The invention claimed is:

1. A radio base station, comprising:
   a handover processing unit configured not to perform a path switch when performing X2 handover processing for a mobile station to another radio base station having same virtual radio base station identification information as the radio base station;
   a determination unit; and
   a management unit configured to manage a neighbor relation table including information on a neighbor radio base station of the radio base station, wherein
   the neighbor relation table includes virtual radio base station identification information of the neighbor radio base station as the information on the neighbor radio base station, and
   the determination unit determines whether or not the neighbor radio base station has the same virtual radio base station identification information as the radio base station by referring to the neighbor relation table.

2. The radio base station according to claim 1, further comprising a reception unit configured to acquire the virtual radio base station identification information included in a connection setup request signal or a connection setup response signal which is received from the neighbor radio base station of the radio base station, and accumulate the virtual radio base station identification information in the management unit.

3. The radio base station according to claim 1, further comprising a transmission unit configured to transmit a connection setup request signal or a connection setup response signal which includes the virtual radio base station identification information of the radio base station, to a neighbor radio base station of the radio base station.

* * * * *